(12) United States Patent
Kuntimaddi et al.

(10) Patent No.: US 12,251,855 B1
(45) Date of Patent: Mar. 18, 2025

(54) METHODS OF REDUCING CENTER SHIFT OF GOLF BALL COMPONENTS AND IMPROVING CONCENTRICITY

(71) Applicant: Acushnet Company, Fairhaven, MA (US)

(72) Inventors: Manjari Kuntimaddi, Raynham, MA (US); Edward Costa, East Providence, RI (US); Erin McDermott, Providence, RI (US)

(73) Assignee: Acushnet Company, Fairhaven, MA (US)

( * ) Notice: Subject to any disclaimer, the term of this patent is extended or adjusted under 35 U.S.C. 154(b) by 141 days.

(21) Appl. No.: 17/979,140

(22) Filed: Nov. 2, 2022

(51) Int. Cl.
| | |
|---|---|
| *B29B 11/10* | (2006.01) |
| *B29B 11/02* | (2006.01) |
| *B29B 13/04* | (2006.01) |
| *A63B 37/00* | (2006.01) |
| *B29L 31/54* | (2006.01) |

(52) U.S. Cl.
CPC .............. *B29B 11/10* (2013.01); *B29B 11/02* (2013.01); *B29B 13/04* (2013.01); *A63B 37/0051* (2013.01); *B29L 2031/546* (2013.01)

(58) Field of Classification Search
CPC ...... B29B 11/10; B29B 13/04; A62B 37/0051
See application file for complete search history.

(56) References Cited

U.S. PATENT DOCUMENTS

| | | | | |
|---|---|---|---|---|
| 4,165,877 A | * | 8/1979 | Miller ................ | A63B 37/0024 473/372 |
| 2001/0008322 A1 | * | 7/2001 | Rosenbaum .......... | B29C 48/022 264/912 |

* cited by examiner

*Primary Examiner* — Monica A Huson
(74) *Attorney, Agent, or Firm* — Bradley Arant Boult Cummings LLP

(57) ABSTRACT

The present disclosure provides methods of reducing center shifting of golf ball components, which, in turn, improves concentricity of the resulting golf balls. The methods include extruding a golf ball component material through an extruder to form an extrudate having a first temperature, cutting the extrudate at a second temperature to form a component prep, and molding the component prep into the golf ball component. The preps formed by the methods of the present disclosure include surfaces having reduced or no concavity.

18 Claims, 9 Drawing Sheets

METHODS OF REDUCING CENTER SHIFT OF GOLF BALL COMPONENTS AND IMPROVING CONCENTRICITY

FIELD OF THE INVENTION

The present disclosure relates generally to golf ball components. More particularly, the present disclosure relates to methods of reducing center shift of components that are used to form golf balls to improve concentricity of the core and the resulting golf ball.

BACKGROUND OF THE INVENTION

Golf balls typically include a center or core and at least one cover layer. Manufacturers are continually refining processes to avoid center shift of multi-layer golf balls and perform quality assessments of finished components and golf balls. Indeed, golf balls with multiple layers/components require multiple steps and typically multiple molding processes. For example, to make a dual core using compression molding, an inner core must be placed within two outer core shells in a mold press assembly and then the assembly is heated under pressure at a precise temperature for a predetermined period of time to allow for crosslinking. Likewise, to make a dual core using injection molding or casting, the inner core is positioned in a mold (typically held in place with a retractable pin for injection molding and vacuum or suction for casting) and then the outer core material is injected/poured into the mold and the holding mechanism is retracted/released. A cover layer may then be disposed on the dual core, typically using injection molding or casting. When done properly, the result is a golf ball with no substantive center shift. However, during any of these process steps, variances in the manufacturing process may affect concentricity of the core and/or the resulting golf ball.

For instance, during the compression molding process for forming a dual core, half-shells are formed by forcing a prep material through an extruder die, cutting the extrudate into shaped preps, and placing the shaped preps into molds to form the half-shells. In the conventional process, the extrudate is cut immediately after extrusion into shaped preps. Center shifting has been known to occur when the shaped preps are formed into core components, which adversely affects the concentricity of the core and the resulting golf ball. Such lack of concentricity or centeredness of the golf ball components may result in performance inadequacies and can affect shot dispersion. In fact, if the inner core of a dual core golf ball is just 40/1000 of an inch off-center, shot dispersion can increase.

Accordingly, there remains a need in the art for methods to decrease the amount of center shifting in rubber preps used for forming golf ball components, such as golf ball cores, to improve concentricity in the resulting cores and golf balls.

SUMMARY OF THE INVENTION

The problems expounded above, as well as others, are addressed by the following inventions, although it is to be understood that not every embodiment of the inventions described herein will address each of the problems described above.

In some embodiments, a method of forming a golf ball component is provided, the method including extruding a golf ball component material through an extruder to form an extrudate, wherein the golf ball component material extruded through the extruder has a first temperature, cooling the extrudate, cutting the extrudate to form a component prep, wherein the component prep comprises a shaped body having at least one end that is substantially planar, and molding the component prep into the golf ball component, wherein the component prep has a second temperature that is less than the first temperature. In one embodiment, the first temperature is about 160° F. to about 230° F. In another embodiment, the second temperature is at least about 100° F. less than the first temperature. In still another embodiment, the golf ball component is a dual core component. In yet another embodiment, the cooling step includes at least one of: selectively cooling the extruder to control the temperature of the golf ball component material extruded therethrough or exposing the extrudate to ambient air.

In further embodiments, a method of forming a golf ball component is provided, the method including extruding a golf ball component material through an extrusion die head, cooling the extrusion die head to control the temperature of the golf ball component material extruded therethrough to form a cooled extrudate, cutting the extrudate to form a component prep, wherein the component prep comprises ends that are substantially planar, and molding the component prep into the golf ball component. In one embodiment, the step of cooling the extrusion die head includes extending a cooling jacket around the extrusion die head. In another embodiment, the method includes circulating a coolant through the cooling jacket. In still another embodiment, the coolant is chilled water, chilled air, liquid nitrogen, ethylene glycol, propylene glycol, or combinations thereof. In yet another embodiment, the coolant has a temperature less than the temperature of the golf ball component material extruded through the extrusion die head. In still another embodiment, the extrusion die head and the cooling jacket extend a length of at least about two feet. In yet another embodiment, the coolant is chilled water having a temperature of about 33° F. to about 40° F. In another embodiment, the golf ball component material extruded through the extrusion die head has a temperature of about 160° F. to about 230° F. In further embodiments, the step for selectively cooling the extrusion die head includes cooling the extrudate to a temperature of about 90° F. or less.

In still further embodiments, a method of forming a golf ball component is provided, the method including extruding a golf ball component material through an extruder to form an extrudate, wherein the extrudate has a first temperature, exposing the extrudate to ambient air to cool the extrudate, cutting the extrudate to form a component prep, wherein the component prep includes at least one end having a surface flatness according to the following ratio:

$$0.9 \leq \frac{L1}{L2} \leq 1$$

where L1 is the length of an edge of the component prep from the center of the surface of the end to the center of a flat portion of the component prep and L2 represents the maximum length along the edge of the component prep to the flat portion, and molding the component prep into the golf ball component, wherein the component prep molded into the golf ball component has a second temperature that is less than the first temperature. In one embodiment, the step of exposing the extrudate to ambient air further includes transporting the extrudate on a continuous conveyer belt. In another embodiment, the second temperature is about two-thirds or less of the first temperature of the extrudate. In still another embodiment, the continuous conveyer has a length of up to 400 feet. In yet another embodiment, the golf ball component is a dual core component. In further embodiments, the ambient air has a temperature of about 68° F. to 77° F.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
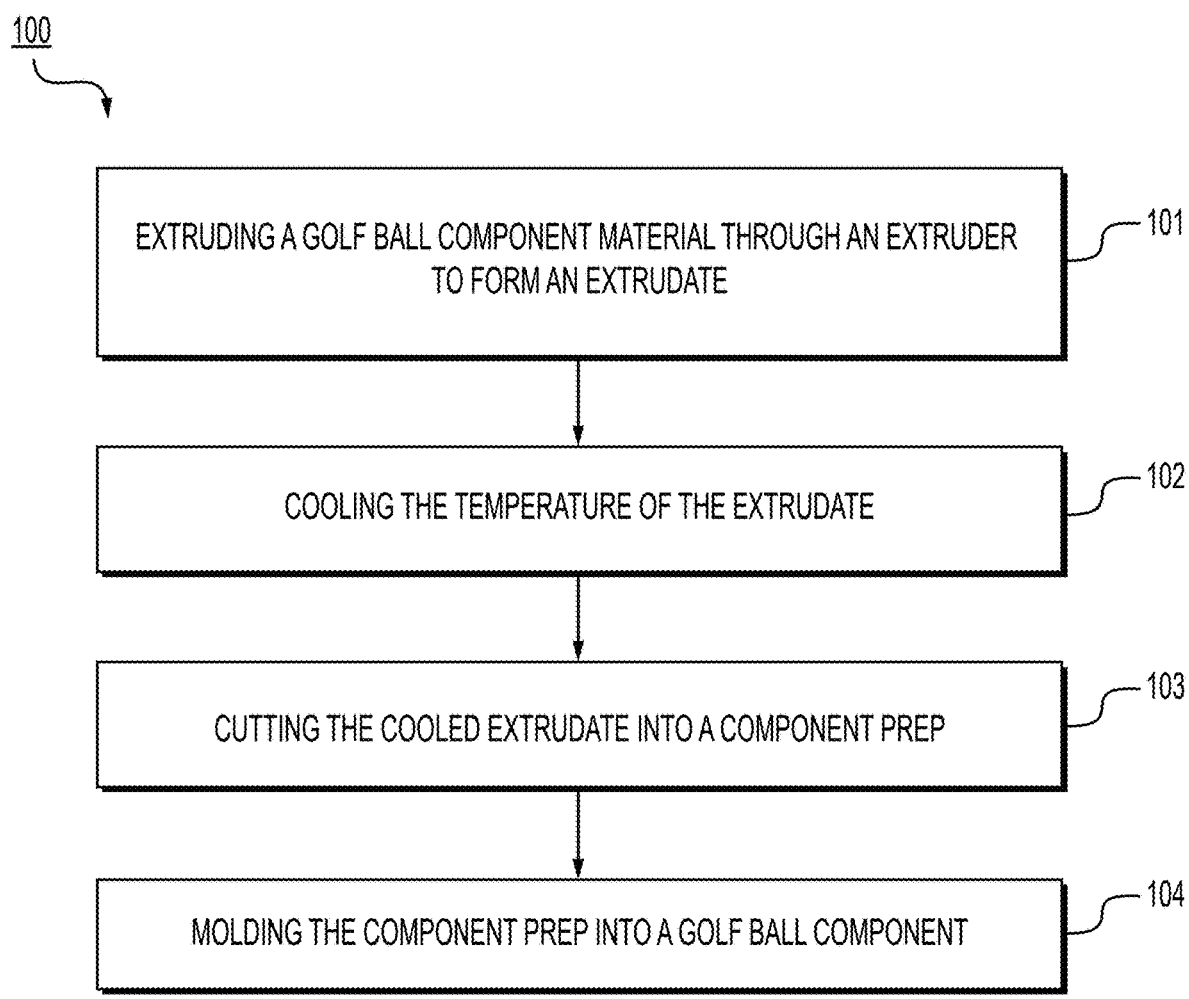
FIG. 1 is a flowchart illustrating the steps according to a method for reducing concavity in golf ball components in accordance with an embodiment of the present disclosure.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," "third," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Spatially relative terms, such as "above," "under," "below," "lower," "over," "upper," and the like, may be used herein for ease of description to describe one element or feature's relationship to another when the apparatus is right side up as shown in the accompanying drawings.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The present disclosure provides methods of reducing concavity in rubber preps that are used to form golf ball components, which, in turn, improves concentricity of the resulting golf ball components, such as core components. As discussed above, when forming rubber preps for golf ball components, the conventional process typically involves cutting the extrudate into shaped preps immediately after extrusion. The shaped preps have been associated with center shifting, which, in turns, results in a lack of concentricity of the finished ball.

Without being bound by any particular theory, it is believed that the concavity in the shaped preps causes the center shifting. Since the concavity in the shaped preps is due to uneven cooling between the outer surface and inner portion of the preps and shrinking that occurs after formation, the inventors conceived of a method to reduce the uneven cooling and shrinking of the shaped preps and, thus, reduce the concavity. In an effort to overcome the problems associated with the conventional process, the methods of the present invention utilize various cooling mechanisms to cool the extrudate before it is cut into shaped preps. By cooling the extrudate before forming the shaped preps, the amount of shrinkage that occurs after cutting the extrudate can be reduced, resulting in less concavity in the shaped preps and better concentricity. Additionally, cooling the extrudate in accordance with the methods of the present disclosure prevents scorching of the extrudate (e.g., preventing it from starting to cure) during the extrusion process and provides for easier processing of the preps (e.g., less processing aids are needed).

FIG. 1 is a flowchart showing the steps of an exemplary method 100 for reducing concavity in golf ball components according to one embodiment of the present disclosure. In some embodiments, at step 101, the methods of the present disclosure include heating and extruding a golf ball component material through a die to form an extrudate. The golf ball component material (and the resulting extrudate) may be any suitable polymeric material for forming a core layer of a golf ball. For example, the golf ball component material may be polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more of the foregoing. In some embodiments, the golf ball component material is an uncured polybutadiene composition. For example, the concentration of polybutadiene rubber in the golf ball component material is about 45 percent to about 95 percent by weight. Preferably, the polybutadiene composition includes at least 50 percent by weight, and more preferably at least 70 percent by weight, polybutadiene rubber.

In this step, the golf ball component material is fed into a feed chamber and the material is moved through the feed chamber by actuating a screw drive. The feed chamber may be a heated chamber. The golf ball component material typically changes into a molten stream by compression forces applied by the screw, heat applied by a heater, and viscous flow friction. The increased pressure forces the molten material through a small opening, called a die, having a desired selectable shape and size. In some embodiments, the cross-sectional shape of the die may be substantially circular. In other embodiments, the cross-sectional shape of the die may be substantially square. In still other embodiments, the cross-sectional shape of the die may be substantially polygonal, such as triangular, pentagonal, hexagonal, heptagonal, or octagonal. The molten golf ball component material extruded from the die is referred to as the extrudate.

At step 102, the methods of the present disclosure involve cooling the temperature of the extrudate prior to cutting the material into shaped preps and molding the prep into a golf ball component. As described above, the golf ball component material changes to a molten material as it is extruded and exits the die. Generally, the temperature of the extrudate as it exits the die is about 200° F. to about 250° F. To reduce the concavity of the shaped prep and, thus, improve concentricity of the finished golf ball component, the methods of the present disclosure include cooling the extrudate to a temperature sufficient to reduce shrinkage that generally occurs after cutting hot extrudate into shaped preps.

In one embodiment, the cooling step involves cooling the extrudate to a temperature of about 150° F. or less prior to molding the prep into a golf ball component. In another embodiment, the cooling step involves cooling the extrudate to a temperature of about 130° F. or less. In still another embodiment, the cooling step involves cooling the extrudate to a temperature of about 110° F. or less. In another embodiment, the cooling step involves cooling the extrudate to a temperature of about 100° F. or less. In yet another embodiment, the cooling step involves cooling the extrudate to a temperature of about 90° F. or less. In still another embodiment, the cooling step involves cooling the extrudate to a temperature of about 75° F. or less. In other embodiments, the cooling step involves cooling the extrudate to a temperature of about 70° F. or less. In still further embodiments, the cooling step involves cooling the extrudate to a temperature of about 60° F. or less.

In some embodiments, the cooling step of the present disclosure includes cooling the extrudate to a temperature that is about 50 degrees to about 150 degrees less than the temperature of the extrudate as it exits the die. In other embodiments, the cooling step of the present disclosure includes cooling the extrudate to a temperature that is about 75 degrees to about 135 degrees less than the temperature of the extrudate as it exits the die. In further embodiments, the cooling step of the present disclosure includes cooling the extrudate to a temperature that is about 90 degrees to about 120 degrees less than the temperature of the extrudate as it exits the die. For example, the cooling step of the present disclosure may include cooling the extrudate to a temperature that is about 100 degrees or less than the temperature of the extrudate as it exits the die. In other embodiments, the cooling step of the present disclosure includes cooling the extrudate to a temperature that is about 90 degrees or less than the temperature of the extrudate as it exits the die. In further embodiments, the cooling step of the present disclosure includes cooling the extrudate to a temperature that is about 75 degrees or less than the temperature of the extrudate as it exits the die.

In some embodiments, the cooling step of the present disclosure involves selectively cooling the die of the extruder to control the temperature of the golf ball component material extruded therethrough. In this embodiment, the cooling step can be achieved with the use of a cooling jacket operatively attached to the die. The extrusion die may be extended by a certain length to allow for a cooling jacket to wrap around or attach to the entirety of the extended length of the extrusion die. The cooling flow of the fluid passing through the cooling jacket absorbs the thermal energy of the hot die and cools the extrudate as it exits the die. This allows for the temperature of the extrudate to cool prior to cutting the extrudate into shaped preps and molding the prep into a golf ball component.

Figure 2:
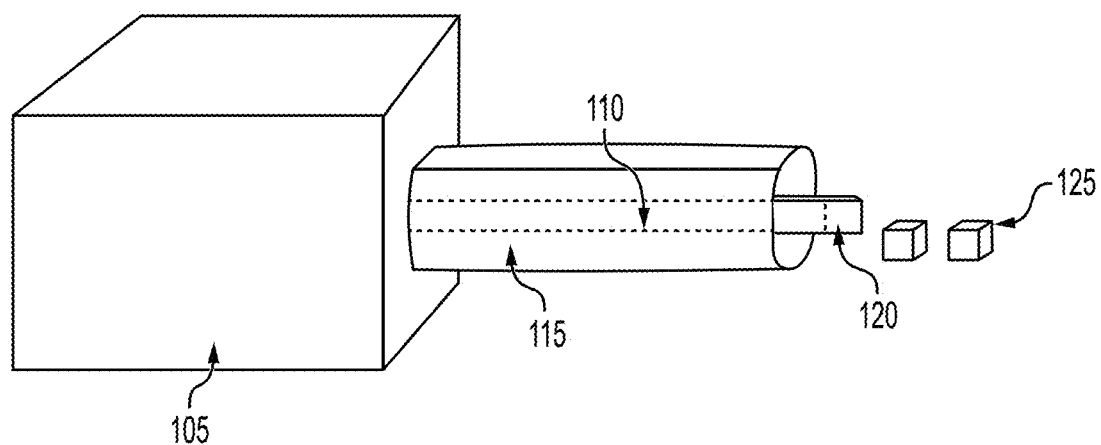
FIG. 2 is a perspective view of an extruder having a cooling jacket attached thereto according to one embodiment of the present disclosure.

FIG. 2 shows an extruder 105 with an extrusion die 110 having a cooling jacket 115 attached thereto according to an exemplary embodiment of the present disclosure. As shown in FIG. 2, the extruder 105 is provided with an extended die 110. A cooling jacket 115 is positioned around the die 110 to define an annular chamber through which a coolant can be by circulated. The cooling jacket 115 may be supplied with the coolant through conduits or pipes (not shown) having a valve unit designed for an adjustable control of the delivery of the respective coolant. The cooling jacket 115 may be affixed to the body of the die 110 by a plurality of screws or bolts (not shown) passing through the cooling jacket and through appropriately threaded openings in the surface of the die body. Extrudate 120 flowing through the die 110 is cooled by the cooling jacket 115.

The cooling jacket 115 extends the entire length of the die 110. In some embodiments, the length of the die 110 is extended by a certain distance (when compared to conventional dies) to allow the extrudate 120 to flow a longer distance within the cooling jacket 115, which, in turn, provides more efficient cooling of the extrudate 120 prior to cutting into preps and molding into a golf ball component. The length of the die 110 may vary depending on the diameter of the die and the size of the extrudate. For example, the larger the die and/or size of the extrudate, the longer the distance the extrudate needs to flow within the cooling jacket to reach the desired cooled temperature. In one embodiment, the length of the die 110 may extend from about 1 foot to about 5 feet. In another embodiment, the length of the die 110 may extend from about 1.5 feet to about 4.5 feet. In still another embodiment, the length of the die 110 may extend from about 1.75 feet to about 3 feet. In yet further embodiments, the length of the die 110 may extend from about 2 feet to about 4 feet.

The cooling jacket 115 circulates a coolant around the outer circumference of the die 110 to cool the extrudate 120 flowing therein. In one embodiment, the cooling jacket 115 utilizes a liquid as the coolant. For example, the liquid may be chilled water. In some embodiments, the chilled water has a temperature of less than 60° F. In further embodiments, the chilled water has a temperature between about 30° F. and 50° F. In still further embodiments, the chilled water has a temperature of about 33° F. to about 40° F. For instance, in some embodiments, the chilled water has a temperature of about 40° F. In other embodiments, the liquid may be a chemical, such as liquid nitrogen, ethylene glycol, or propylene glycol. In some embodiments, the coolant is liquid nitrogen. In other embodiments, the coolant may be a combination of chilled water and one or more chemicals, such as ethylene glycol or propylene glycol.

In still further embodiments, the cooling step may be performed by running chilled air through the cooling jacket. Generally running a liquid through the cooling jacket removes more heat than does running air through cooling jacket; however, the chilled air can remove some of the heat generated by the molten extrudate. In some embodiments, the chilled air has a temperature of less than 70° F. For example, the chilled air may have a temperature of about 25° F. to about 70° F.

In other embodiments, the cooling step of the present disclosure may be achieved by exposing the extrudate to ambient air. "Ambient air," as used herein, refers to air having a temperature of about 68° F. to 77° F. In this embodiment, as the extrudate exits the die, the extrudate may be placed on a continuous conveyer belt. The conveyer belt can transport the extrudate to a station for cutting. This allows for the temperature of the extrudate to cool prior to cutting the extrudate into shaped preps and molding into the golf ball components. The conveyer belt may extend or snake through the manufacturing plant to allow the extrudate a sufficient amount of time to cool prior to arriving at the station for cutting and molding.

Figure 3:
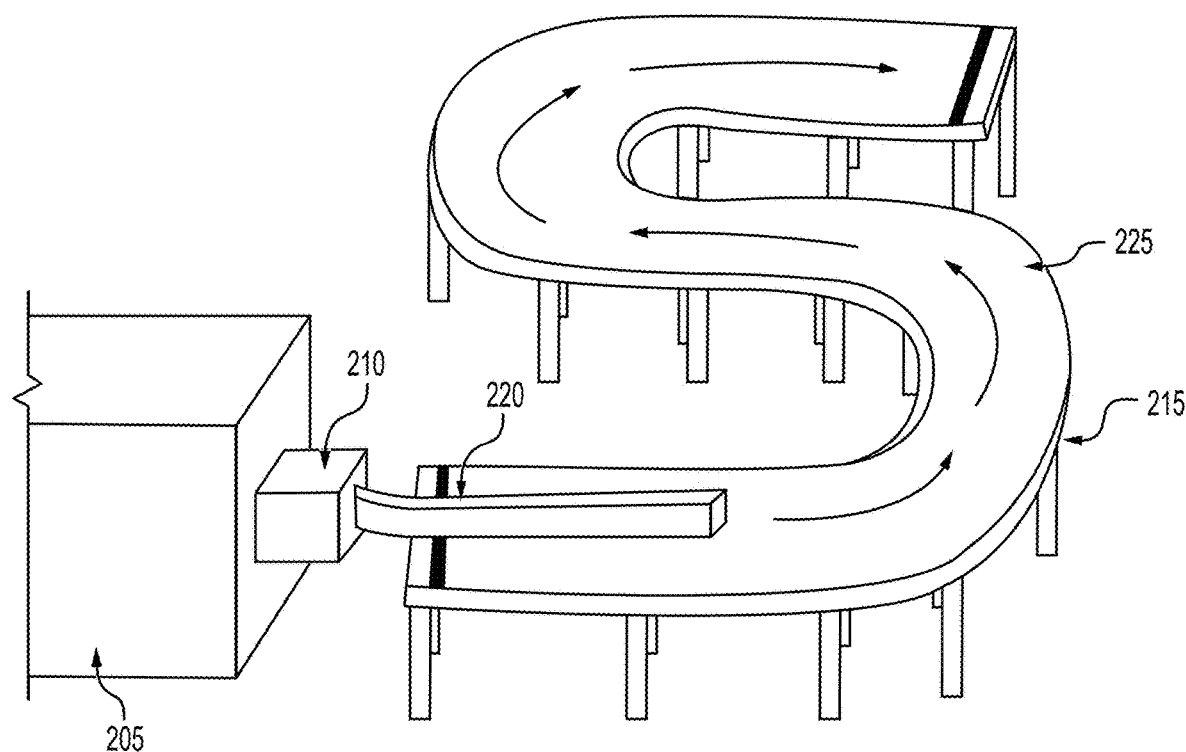
FIG. 3 is a perspective view of an extruder having a conveyer belt assembly operatively connected thereto according to one embodiment of the present disclosure.

FIG. 3 shows an extruder 205 having a conveyer assembly 215 operatively connected thereto according to an exemplary embodiment of the present disclosure. As shown in FIG. 3, the extruder 205 is provided with a die 210. Extrudate 220 flows through the die 210 and onto the conveyer assembly 215. The conveyer assembly 215 extends from the die 210 to a station for cutting the extrudate (not shown). The conveyer assembly 215 includes a movable conveyer belt 225 for transporting the extrudate 220 to the cutting station. The conveyer belt 225 has an outside surface that is fairly smooth and free of discontinuities to prevent damage to the extrudate 220. As the extrudate 220 exits the die 210, the extrudate 220 is placed on the conveyer belt 225 which moves at a rate sufficient to allow the extrudate 220 to cool to the desired temperature before it reaches the cutting station.

In this aspect, the length of the conveyer belt 225 should be sufficiently long enough to allow for the extrudate 220 to cool before it reaches the station for cutting. In one embodiment, the length of the conveyer belt 225 is at least about 50 feet. In another embodiment, the length of the conveyer belt 225 may range from about 50 feet to about 100 feet. In still another embodiment, the length of the conveyer belt 225 may range from about 65 feet to about 85 feet. In yet another embodiment, the length of the conveyer belt 225 may range from about 70 feet to about 80 feet.

In other embodiments, the length of the conveyer belt 225 is at least about 100 feet. In another embodiment, the length of the conveyer belt 225 may range from about 100 feet to about 250 feet. In still another embodiment, the length of the conveyer belt 225 may range from about 125 feet to about 225 feet. In yet another embodiment, the length of the conveyer belt 225 may range from about 150 feet to about 200 feet. In another embodiment, the length of the conveyer belt 225 may range from about 160 feet to about 190 feet. In still another embodiment, the length of the conveyer belt 225 may range from about 170 feet to about 180 feet.

In further embodiments, the length of the conveyer belt 225 is at least about 250 feet. In another embodiment, the length of the conveyer belt 225 may range from about 250 feet to about 400 feet. In still another embodiment, the length of the conveyer belt 225 may range from about 275 feet to about 375 feet. In yet another embodiment, the length of the conveyer belt 225 may range from about 290 feet to about 350 feet. In still another embodiment, the length of the conveyer belt 225 may range from about 300 feet to about 325 feet.

The rate at which the conveyer belt 225 moves the extrudate 220 from the die to the cutting station and the molding station may depend on the length of the conveyer belt and the size of the extrudate. In some embodiments, the conveyer belt 225 moves at a speed sufficient to cool the extrudate to a temperature at molding that is at least about 75 degrees less than the temperature of the extrudate as it exits the die. In further embodiments, the conveyer belt 225 moves at a speed sufficient to cool the extrudate to a temperature at molding that is at least about 100 degrees less than the temperature of the extrudate as it exits the die. In further embodiments, the conveyer belt 225 moves at a speed sufficient to cool the extrudate to a temperature at molding that is at least about 120 degrees less than the temperature of the extrudate as it exits the die. As one of ordinary skill in the art will appreciate, the speed at which the conveyer belt moves can be increased or decreased depending on the rate of cooling of the extrudate as it exits the die.

While the use of mechanisms such as a cooling jacket and a conveyer belt have been exemplified herein as ways to sufficiently cool the extrudate, it will be apparent to those skilled in the art that the hot extrudate may be cooled using other methods known in the art. Other methods that sufficiently cool the extrudate to the temperatures described herein before cutting the extrudate into shaped preps and molding into golf ball components can be used. In addition, those of ordinary skill in the art will understand that the cooling mechanisms described may be used alone or in combination with one another to perform the methods of the present disclosure.

After the extrudate is sufficiently cooled, the methods of the present disclosure include forming the cooled extrudate into a component prep (step 103). The term, "component prep," as used herein refers to a rubber composition that has been extruded as an extrudate and cut into a predetermined shape for forming a layer of a golf ball component, such as a layer of a dual core. The extrudate can be formed into the component prep by cutting the extrudate into a predetermined shape. FIG. 2 illustrates component preps 125 formed by cutting the extrudate 120 into a square shape. In some embodiments, a cutter may be placed at the head of the extruder so that the extrudate may be cut into the desired preps. For instance, in embodiments where the extrudate is cooled using a cooling jacket attached to the die (such as those described in accordance with FIG. 2), the cutter may be placed at the end of the cooling jacket (as the extrudate exits the die) so that the cooled extrudate is cut into the desired preps. In other embodiments, a cutter may be placed at a specific location away from the die. For example, in embodiments where the extruder is cooled using a conveyer belt assembly (such as those described in accordance with FIG. 3), the cutter may be positioned at a cutting station located at the end of the conveyer belt so that the cooled extrudate can be cut into the desired preps.

Figure 4A:
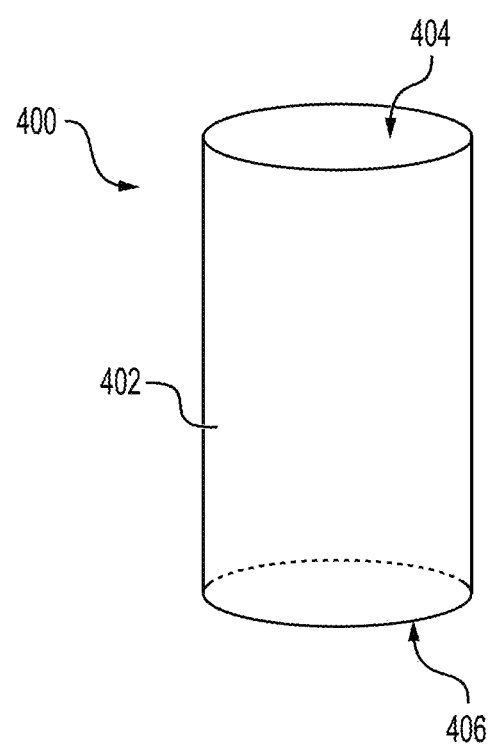
FIG. 4A is a perspective view of a component prep formed in accordance with one embodiment of the present disclosure.
Figure 4B:
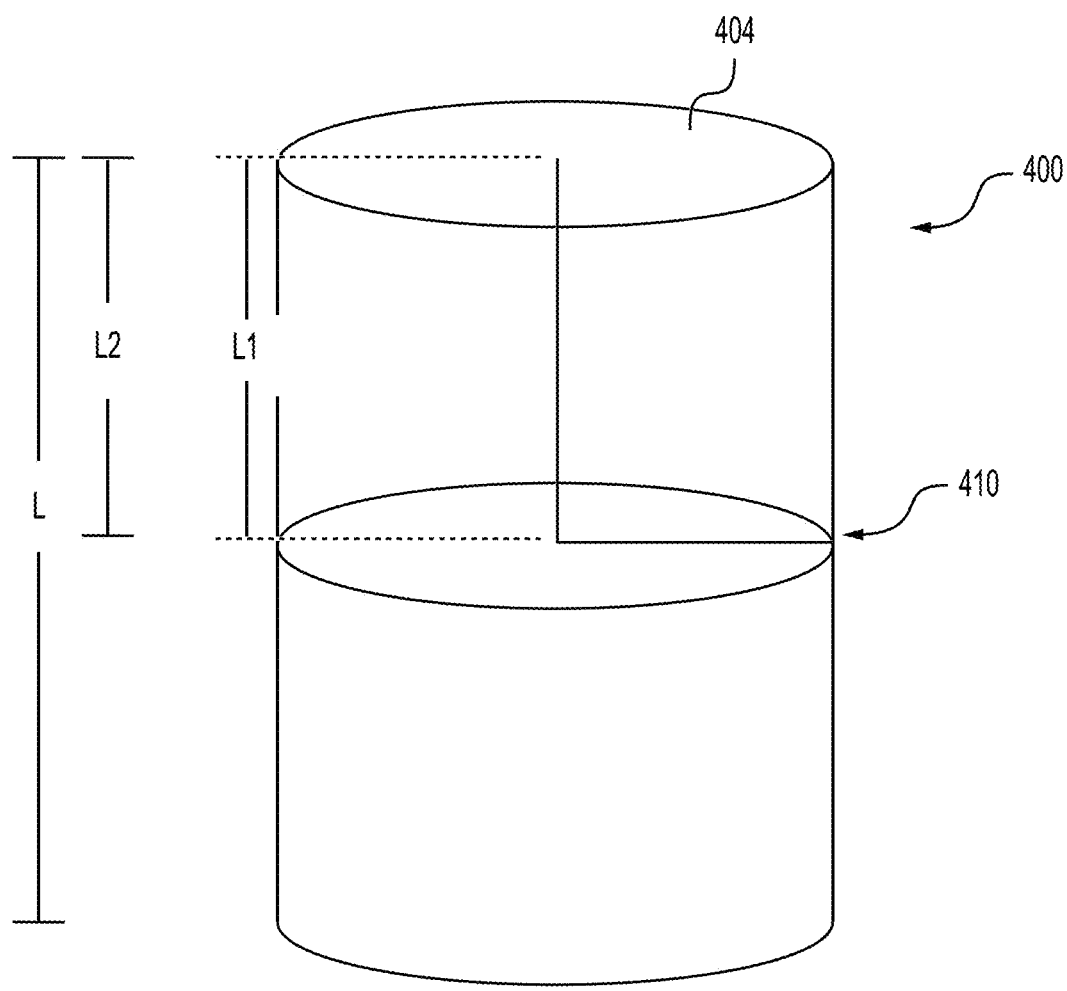
FIG. 4B is an isometric view of the component prep formed in accordance with one embodiment of the present disclosure.

FIGS. 4A and 4B show a component prep 400 formed in accordance with an exemplary embodiment of the present disclosure. In the illustrated embodiment, the cooled extrudate is cut into a cylindrically shaped component prep 400. In this embodiment, the component prep 400 has a cylindrically shaped body 402 with a first end 404 and a second end 406. While FIGS. 4A and 4B illustrate a cylindrically shaped component prep, those of ordinary skill in the art will appreciate that the component preps may be cut into other shapes as well, such as square, rectangular, or oval shapes.

Because the methods of the present disclosure involve cooling the extrudate before forming the component preps, most, if not all, of the shrinkage that happens as the extrudate cools has already occurred by the time the extrudate is cut into component preps. This results in component preps having ends that are substantially flatter than the ends of component preps cut immediately after the hot extrudate exits the die. Preps that are cut immediately after exiting the die generally form ends that have a substantially concave curvature due to shrinking that occurs after the material cools.

In some embodiments, the first and second ends 404, 406 of the component prep 400 formed in accordance with the present disclosure have a surface flatness according to the ratio shown in Equation I below:

$$0.9 \leq \frac{L1}{L2} \leq 1 \quad \text{(I)}$$

where L1 represents the length of the edge of the component prep 400 from the center of the surface of the first end 404 to the center of the flat bottom 410 and L2 represents the maximum length along the edge of the component prep 400 to the flat bottom 410, as shown in FIG. 4B.

In further embodiments, the first and second ends 404, 406 of the component prep 400 formed in accordance with the present disclosure have a surface flatness according to the ratio shown in Equation II below:

$$0.95 \leq \frac{L1}{L2} \leq 1 \quad \text{(II)}$$

where L1 represents the length of the edge of the component prep 400 from the center of the surface of the first end 404 to the center of the flat bottom 410 and L2 represents the maximum length along the edge of the component prep 400 to the flat bottom 410, as shown in FIG. 4B.

In still further embodiments, the first and second ends 404, 406 of the component prep 400 formed in accordance with the present disclosure have a surface flatness according to the ratio shown in Equation III below:

$$0.98 \leq \frac{L1}{L2} \leq 1 \quad \text{(III)}$$

where L1 represents the length of the edge of the component prep 400 from the center of the surface of the first end 404 to the center of the flat bottom 410 and L2 represents the maximum length along the edge of the component prep 400 to the flat bottom 410, as shown in FIG. 4B.

In yet further embodiments, the first and second ends 404, 406 of the component prep 400 formed in accordance with the present disclosure have a surface flatness according to the ratio shown in Equation IV below:

$$\frac{L1}{L2} = 1 \quad \text{(IV)}$$

where L1 represents the length of the edge of the component prep 400 from the center of the surface of the first end 404 to the center of the flat bottom 410 and L2 represents the maximum length along the edge of the component prep 400 to the flat bottom 410, as shown in FIG. 4B. In this embodiment, the first and second ends 404, 406 of the component prep 400 are substantially planar. As used herein, "substantially planar" means all points of the surface lie in the same plane. In other words, because the first and second ends 404, 406 are substantially planar, there is no indication of concavity.

In other embodiments, the surface flatness of the first and second ends 404, 406 may be determined by the radius of curvature of the concave surface. As used herein, the "radius of curvature" refers to the radius of an approximating circle passing through points on the depicted curve. The radius of curvature is used to determine the flatness of a curve. Generally, the flatter the curvature, the longer the radius of curvature. Additionally, as will be appreciated by those skilled in the art, the radius of curvature measurements described below generally apply only to cylindrically shaped component preps and can vary based on the shape and dimensions of the die and the extrudate that forms the component prep.

Figure 4C:
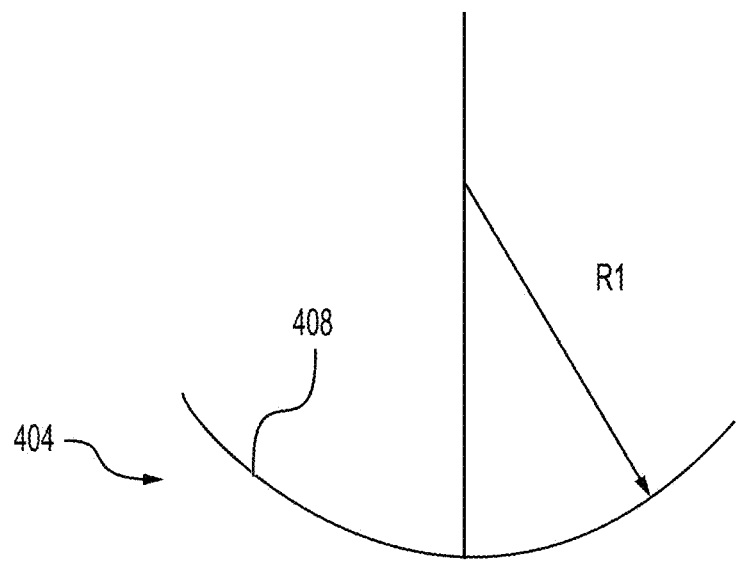
FIG. 4C is a cross-sectional view of the component prep shown in FIG. 4A.

FIG. 4C shows a cross-sectional view of a surface of the first end 404 of the component prep 400 according to one embodiment. As illustrated in FIG. 4C, the first end 404 may have an interior concave surface 408 with a radius of curvature R1. While not shown in FIG. 4C, the second end 406 has a similar interior concave surface with a radius of curvature.

The radius of curvature R1 of the ends 404, 406 of the component preps 400 formed in accordance with the present disclosure is generally longer than the radius of curvature of the ends of component preps cut immediately after extrusion. In some embodiments, the radius of curvature R1 may range from about 0.3 inches to about 1.5 inches. In other embodiments, the radius of curvature R1 of the ends 404, 406 of the component preps 400 formed in accordance with the present disclosure may range from about 0.5 inches to about 1.25 inches. In still other embodiments, the radius of curvature R1 of the ends 404, 406 of the component preps 400 formed in accordance with the present disclosure may range from about 0.75 inches to about 1.15 inches. In yet other embodiments, the radius of curvature R1 of the ends 404, 406 of the component preps 400 formed in accordance with the present disclosure may range from about 0.9 inches to about 1.05 inches. In still other embodiments, the component preps 400 may have ends 404, 406 that are substantially planar.

In some embodiments, the radius of curvature R1 of the ends 404, 406 of the component preps 400 formed in accordance with the present disclosure is at least about 0.1 inches greater than the radius of curvature of preps cut immediately after extrusion. In other embodiments, the radius of curvature R1 of the ends 404, 406 of the component preps 400 formed in accordance with the present disclosure is at least about 0.25 inches greater than the radius of curvature of preps cut immediately after extrusion. In still other embodiments, the radius of curvature R1 of the ends 404, 406 of the component preps 400 formed in accordance with the present disclosure is at least about 0.5 inches greater than the radius of curvature of preps cut immediately after extrusion. In yet further embodiments, the radius of curvature R1 of the ends 404, 406 of the component preps 400 formed in accordance with the present disclosure is at least about 0.75 inches greater than the radius of curvature of preps cut immediately after extrusion. In still further embodiments, the radius of curvature R1 of the ends 404, 406 of the component preps 400 formed in accordance with the present disclosure is at least about 1 inch greater than the radius of curvature of preps cut immediately after extrusion.

At step 104, the component prep may be molded into a golf ball component. In some embodiments, the temperature of the extrudate of the component prep at the time of molding is at least about one-third of the temperature of the extrudate as it exits the die. In other embodiments, the temperature of the extrudate of the component prep at the time of molding is at least about one-half of the temperature of the extrudate at is it exits the die. In still further embodiments, the temperature of the extrudate of the component prep at the time of molding is at least about two-thirds of the temperature of the extrudate as it exits the die. In yet further embodiments, the temperature of the extrudate of the component prep at the time of molding is at least about four-fifths of the temperature of the extrudate as it exits the die.

In some embodiments, the component prep is molded into a core component for forming a dual core. The dual cores may be formed by placing the component prep in the cavities of top and bottom mold plates. The top and bottom mold plates are then moved into a mold press, heated, and compressed. After the component prep has been formed into hemispherical shells, the mold assembly is removed from the press and ball centers are placed within the hemispherical shells. The top and bottom mold plates are then placed back into the press and are heated and compressed again to form the dual core. Note that although the present disclosure has been exemplified herein for forming half-shells of a dual core, the present disclosure may also be employed to form other components of the golf ball by employing the extruded, cut component prep in different molds in methods and apparatuses known in the art. Thus, for example, the present disclosure may be employed to create all or part, such as a half, of cores, including inner, intermediate, and outer core layers, covers, including inner and outer covers, and other components of a golf ball, including a single piece, or half of a single piece, golf ball.

Figure 5:
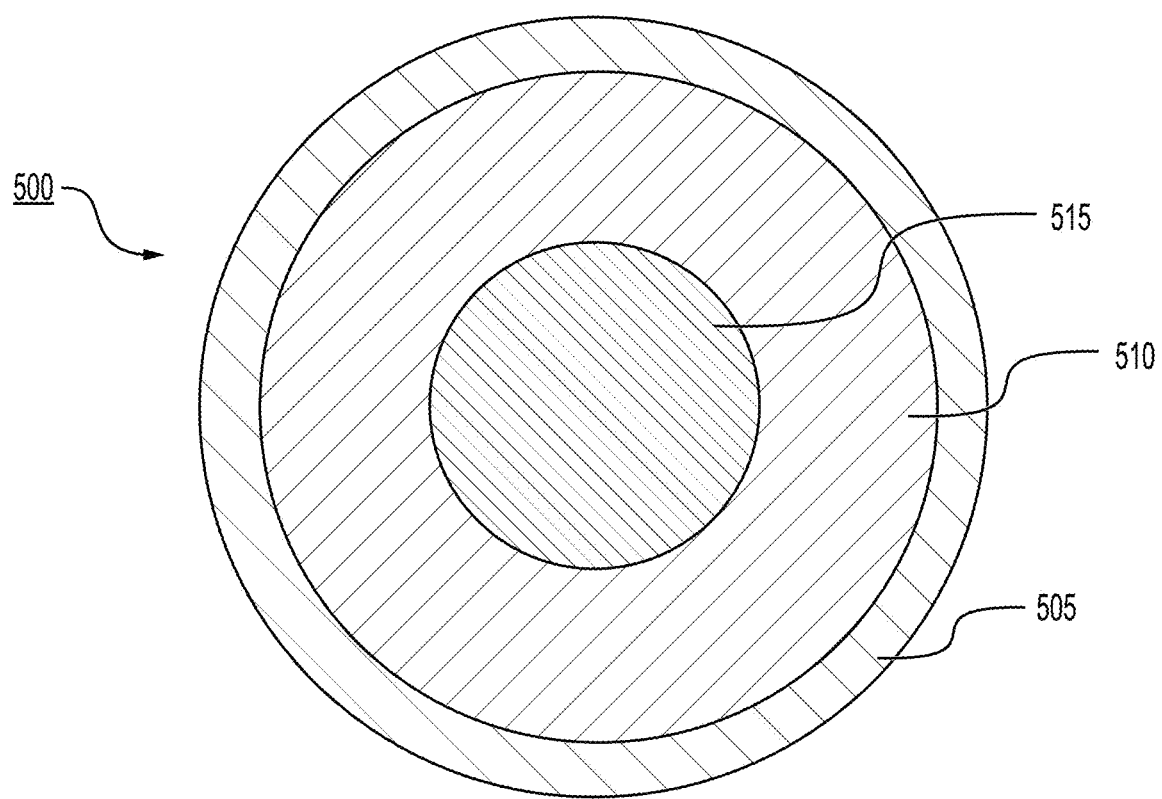
FIG. 5 is a cross-sectional view of a golf ball having an outer core layer formed in accordance with an embodiment of the present disclosure.

The dual cores formed by the methods of the present disclosure may be assembled with a cover layer to form a golf ball. FIG. 5 shows a cross-section of an exemplary golf ball 500 that may be formed with the dual cores of the present disclosure. As shown in FIG. 5, the golf ball 500 has a cover 505 disposed over a dual core, where the dual core includes an outer core layer 510 formed by the methods of the present disclosure and an inner core layer 515. In this embodiment, the present disclosure provides golf balls including a cover layer disposed over a core layer including a spherical subassembly (e.g., the inner core layer) surrounded by an outer layer comprised of first and second compression molded half-shells formed by the methods of the present disclosure. Any conventional material may be used in preparing the golf ball cover disposed over the core. For example, as is well known in the art, ionomers, balata, and urethanes are suitable golf ball cover materials. Conventional compression and injection-molding methods can be used to form cover layers over the dual core. For example, the golf ball layers, such as the cover layers, may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. While FIG. 5 shows a three-piece golf ball with a cover disposed over a dual core, it will be appreciated by one of ordinary skill in the art that any number or type of intermediate layers may be used on the golf ball, as desired. For instance, the golf ball may be a five-piece golf ball including a dual core, an inner mantle layer, an outer mantle layer, and a cover.

The golf ball components, such as the dual cores, formed by the methods of the present disclosure exhibit improved characteristics. For example, the methods described herein form component preps having less concavity, which, in turn, provides for golf ball components having improved concentricity. In this embodiment, the golf ball components formed by the methods of the present disclosure have improved concentricity between the subassembly and outer layers once the golf ball components are compression molded about the subassembly and formed into dual cores. As will be appreciated by one of ordinary skill in the art of golf ball manufacture (as well as the typical player), the more accurate centering of the ball results in more consistent results and an improved game.

In some embodiments, the midpoint of a dual core prepared according to the present disclosure is typically no more than about 0.02 inches from the midpoint of the golf ball center. In other words, a dual core produced by the methods of the present disclosure may be about 0.02 inches or less out of concentricity. In another embodiment, the dual cores produced by the methods of the present disclosure are generally about 0.015 inches or less out of concentricity. In still another embodiment, the dual cores produced by the methods of the present disclosure are generally about 0.010 inches or less out of concentricity. In yet another embodiment, the dual cores produced by the methods of the present disclosure are generally about 0.005 inches or less out of concentricity.

The concentricity measurement may alternatively be expressed as a percentage of center shift relative to the outer layer thickness. For example, in one embodiment, the dual cores of the present disclosure have a center shift relative to the outer layer (or closest adjacent layer) thickness of about 8 percent or less. In another embodiment, the dual cores of the present disclosure have a center shift relative to the outer layer thickness of about 7 percent or less. In still another embodiment, the dual cores of the present disclosure have a center shift relative to the outer layer (or closest adjacent layer) thickness of about 6 percent or less. In yet another embodiment, the dual cores of the present disclosure have a center shift relative to the outer layer (or closest adjacent layer) thickness of about 5 percent or less. In still another embodiment, the dual cores of the present disclosure have a center shift relative to the outer layer (or closest adjacent layer) thickness of about 4 percent or less. For example, the dual cores of the present invention may have a center shift of about 3.5 percent or less (based on the center shift relative to the outer layer thickness).

Due to the improved concentricity of the golf ball components formed by the methods of the present disclosure, the resulting golf balls also exhibit a number of improved properties. For example, the resulting golf balls exhibit consistent shot dispersion due to the improved concentricity. Shot dispersion refers to the distance the golf ball unintentionally flies to the right or left. The resulting golf balls formed in accordance with the present disclosure may exhibit reduced shot dispersion due to the improved concentricity. Additionally, the resulting golf balls demonstrate improved durability. Indeed, golf balls produced from golf ball components formed by the methods of the present disclosure are significantly more durable than golf balls formed from components made using conventional preps.

EXAMPLES

The following non-limiting examples demonstrate component preps, golf balls, and golf ball cores that may be made in accordance with the present disclosure. The examples are merely illustrative of the preferred embodiments of the present disclosure and are not to be construed as limiting the disclosure, the scope of which is defined by the appended claims.

Example 1: Formation of Component Preps

An exemplary component prep was prepared in accordance with the methods of the present disclosure. A golf ball component material was first extruded through an opening of a die to form an extrudate. The temperature of the extrudate as it exited the die was about 160° F. to about 230° F. The extrudate was cooled using the methods disclosed herein and then cut into a component prep. The temperature of the extrudate at cutting was about 100° F. to about 150° F.

A control prep was prepared for comparison purposes. A golf ball component material was first extruded through an opening of a die to form an extrudate. The extrudate was cut into a component prep immediately after the extrudate exited the die. The temperature of the extrudate at cutting was about 200° F. to about 230° F.

Figure 6A:
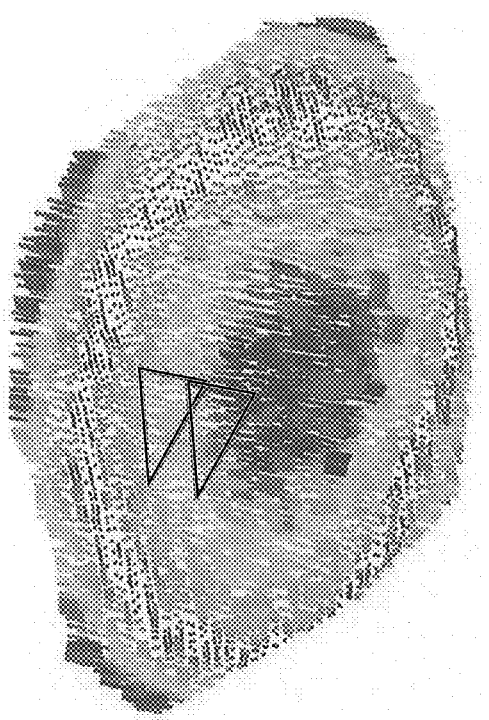
FIG. 6A shows the surface geometry of a control component prep.
Figure 6B:
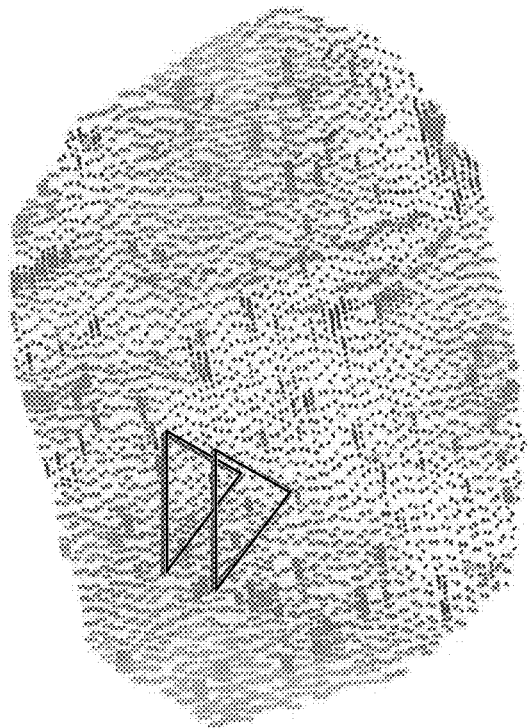
FIG. 6B shows the surface geometry of a component prep formed in accordance with an embodiment of the present disclosure.

FIGS. 6A and 6B show the surface geometry of the control prep and the exemplary component prep, respectively. As shown in FIGS. 6A and 6B, the ends of the exemplary component prep are flatter than the ends of the control prep. This example demonstrates that cutting the prep after sufficient cooling has occurred eliminates the concave geometry seen in preps that are cut immediately after the extrudate exits the extruder.

Example 2: Formation of Dual Cores

Dual cores were produced from the exemplary component preps and the control preps formed in Example 1. Conventional molding techniques known in the art were used for forming the dual cores.

Figure 7:
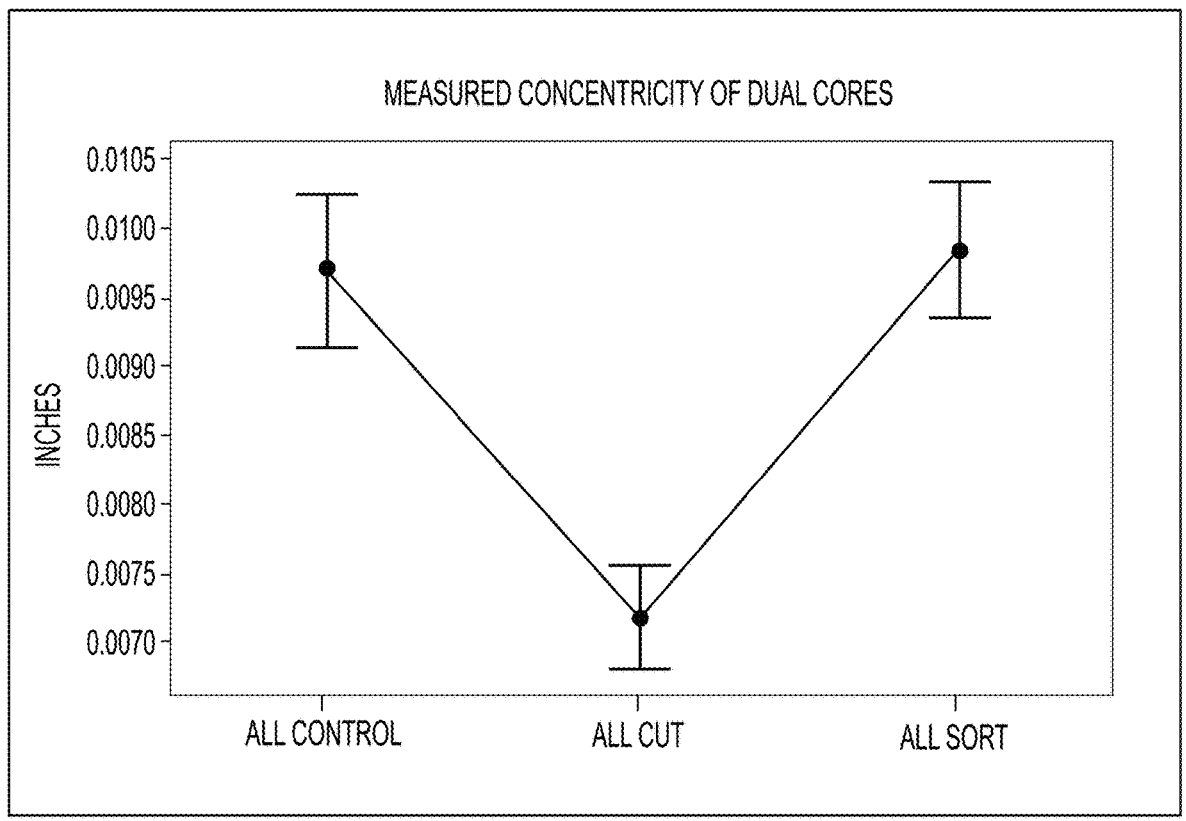
FIG. 7 is a graph showing the measured concentricity of dual cores produced from component preps formed in accordance with the present disclosure as well as dual cores produced from control component preps.

The dual cores underwent testing to determine the concentricity of the cores. For example, to determine the concentricity of the dual core, the core was cut open to determine the distance the core shifted. FIG. 7 is a graph showing the measured concentricity of the dual cores. As shown in FIG. 7, the dual cores produced from the exemplary component preps demonstrated superior concentricity. Indeed, due to the flatter surface geometry of the exemplary component preps, the dual cores produced from the exemplary component preps exhibited minimal shifting when compared to the dual cores formed from the control preps (e.g., about 0.0072 inches for the exemplary cores versus 0.0098 inches for the control cores).

The golf balls and methods described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the golf balls and the methods in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A method of forming a golf ball component, comprising:
   cooling a die of an extruder to control the temperature of a golf ball component material extruded therethrough,
   extruding the golf ball component material through the die to form an extrudate, wherein the golf ball component material extruded through the extruder has a first temperature,
   cutting the extrudate to form a component prep, wherein the component prep comprises a shaped body having at least one end that is substantially planar and the component prep has a second temperature that is less than the first temperature, and
   molding the component prep into the golf ball component.

2. The method of claim 1, wherein the first temperature is about 160° F. to about 230° F.

3. The method of claim 1, wherein the second temperature is at least about 100° F. less than the first temperature.

4. The method of claim 1, wherein the golf ball component is a dual core component.

5. A method of forming a golf ball component, comprising:
   extending a cooling jacket around an extrusion die head,
   cooling the extrusion die head to control the temperature of a golf ball component material extruded therethrough,
   extruding the golf ball component material through the extrusion die head to form a cooled extrudate,
   cutting the cooled extrudate to form a component prep, wherein the component prep comprises ends that are substantially planar, and
   molding the component prep into the golf ball component.

6. The method of claim 5, further comprising circulating a coolant through the cooling jacket.

7. The method of claim 6, wherein the coolant comprises chilled water, chilled air, liquid nitrogen, ethylene glycol, propylene glycol, or combinations thereof.

8. The method of claim 7, wherein the coolant has a temperature less than the temperature of the golf ball component material extruded through the extrusion die head.

9. The method of claim 5, wherein the extrusion die head and the cooling jacket extend a length of at least about two feet.

10. The method of claim 7, wherein the coolant is chilled water having a temperature of about 33° F. to about 40° F.

11. The method of claim 5, wherein the golf ball component material extruded through the extrusion die head has a temperature of about 160° F. to about 230° F.

12. The method of claim 5, wherein the cooled extrudate has a temperature of about 90° F. or less.

13. A method of forming a golf ball component, comprising:

extending a cooling jacket around an extrusion die head, circulating a coolant through the cooling jacket to cool the extrusion die head, extruding a golf ball component material through the extrusion die head to form a cooled extrudate, wherein the cooled extrudate has a temperature less than the temperature of the golf ball component material, cutting the extrudate to form a component prep, wherein the component prep comprises at least one end having a surface flatness according to the following ratio:

$$0.9 \le \frac{L1}{L2} \le 1$$

where L1 is the length of an edge of the component prep from the center of the surface of the end to the center of a flat portion of the component prep and L2 represents the maximum length along the edge of the component prep to the flat portion, and molding the component prep into the golf ball component.

14. The method of claim 13, wherein the temperature of the cooled extrudate is about two-thirds or less of the temperature of the golf ball component.

15. The method of claim 13, wherein the golf ball component is a dual core component.

16. The method of claim 13, wherein the coolant comprises chilled water, chilled air, liquid nitrogen, ethylene glycol, propylene glycol, or combinations thereof.

17. The method of claim 16, wherein the coolant has a temperature less than the temperature of the golf ball component material extruded through the extrusion die head.

18. The method of claim 16, wherein the coolant is chilled water having a temperature of about 33° F. to about 40° F.

* * * * *